Figure 1:
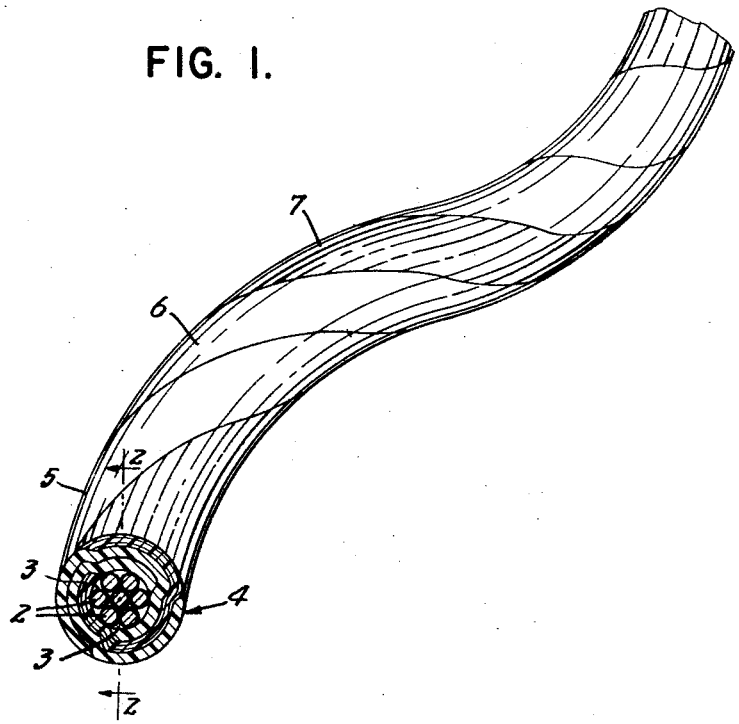

Sept. 18, 1962  C. E. NIXON  3,054,710
INSULATED WIRE
Filed Aug. 5, 1954

INVENTOR.
CHARLES E. NIXON
BY
Curtis, Morris & Safford.
ATTORNEYS

United States Patent Office 3,054,710
Patented Sept. 18, 1962

3,054,710
INSULATED WIRE
Charles E. Nixon, Sayville, N.Y., assignor to Adam Consolidated Industries, Inc., New York, N.Y., a corporation of New York
Filed Aug. 5, 1954, Ser. No. 448,057
6 Claims. (Cl. 156—52)

The present invention relates to electrical wire helically wrapped with insulating tape of synthetic resin formed into an insulation layer surrounding the wire and, more particularly, to electrical wire wrapped with unfused tapes of polytetrafluorethylene and fused into an impervious homogeneous insulation layer.

Among the advantages of the present invention is the fact that the insulation layer is impervious and is formed from helically wound tape or tapes. Moreover, when two or more tapes of contrasting color are used, a spiral identifying "tracer" is formed in the insulation layer. This tracer is integral with the insulation, extending from the inner to the outer surfaces of the insulation, making identification easy under all conditions. It cannot be worn off. Advantageously, the tape forming the tracer can be of the same material as the other tape or tapes forming the insulation layer, so that the insulation layer has homogeneous electrical properties.

The problems involved in providing a wire insulated with a fused layer of polytetrafluorethylene formed of unfused tapes helically wound on the wire are very different from those involved in providing a wire wound with a fabric tape, as will be understood. Previous attempts to provide such a fused insulation layer of polytetrafluorethylene have been unsuccessful because the resulting insulation has included a fairly high number of voids and perforations, which allow the penetration of moisture and create low resistance electrical leakage paths through the insulation. For example, currently users of such insulated wire will accept having as many as fifteen breaks or perforations in the insulation layer per hundred feet of wire. These problems are further increased when one of the tapes is of contrasting color, for variations in the winding of the insulation cause the resulting helical tracer to appear irregular as seen at the surface of the insulation. In previous attempts to provide such polytetrafluorethylene insulated wire with a helical tracer, the tracer has been of widely varying widths, for example, in many instances the width of the tracer has varied from the full width of the contrasting tape, that is, when the contrasting tape overlies the other tapes, to no tracer at all, when the contrasting tape is fully covered by the other tapes. These complete reversals have commonly occurred along only a few feet of wire, requiring the manufacturers to cut up the insulated wire in short lengths, some lengths then being sold as "tracer wire" and some as plain insulated wire. The wastage of wire and insulation materials which has commonly occurred in the manufacture of even such short cut lengths of tracer wire has been considerable.

The insulated wire described herein is of uniformly high quality with no breaks or perforations in the insulation layer, and where a tracer is provided it is neat in appearance and of uniform width along any length of wire desired.

Additionally, the insulation layer on the wire described herein has all of the highly favorable qualities of polytetrafluorethylene, for example, its ability to remain flexible in operating temperatures anywhere in the extremely wide range from −94° F. to 518° F. and to withstand extremely abrupt changes in temperature without adverse effect. The insulation layer on the wire described herein has high mechanical strength, high dielectric strength, low loss characteristics throughout the electronic frequency spectrum, and very low moisture absorption, etc.

Figure 2:
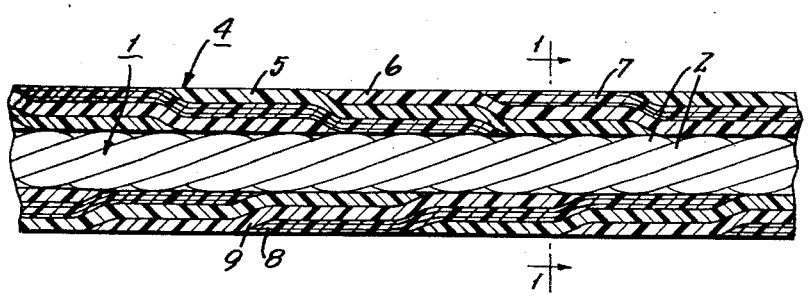

The various other aspects and advantages of the present invention will be understood from a consideration of the following description in conjunction with the accompanying drawing, in which:

FIGURE 1 is a perspective view, partially in section, of an insulated wire embodying the present invention and having a helical contrasting tracer integral with the insulation; and FIGURE 2 is a longitudinal sectional view, on enlarged scale, of a length of wire as shown in FIGURE 1.

In the embodiment of the invention shown in the drawings, the conductor, generally indicated at 1, is stranded and includes seven copper wires 2, each coated with a layer 3 of silver to prevent oxidation of the copper. Around the conductor is a fused, impervious, homogeneous insulation layer, generally indicated at 4 and comprised of three helically wound tapes 5, 6, and 7, respectively, of polytetrafluorethylene.

In order to provide a tracer integral with the rest of the insulation, one of the tapes, here shown as 7, is of the same material as the other tapes but has a contrasting color. For example, the tapes 5 and 6 may be white, while the tape 7 may be a dark color, such as blue. The tapes 5, 6, and 7 are wound on the wire in overlapping helical paths so that an inner one-third of the width of each tape lies adjacent the central conductor, the intermediate one-third overlies the inner one-third of an adjacent tape, while the outer one-third of each tape overlies portions of two adjacent tapes. As shown, the tapes smoothly fair into each other after being fused, as explained hereinafter.

Preferably, the tapes, 5, 6, and 7 are of unfused polytetrafluorethylene and are wound on the wire in helical paths passing around the conductor 1 in a direction opposite to the lay of the strands 2, to provide a smoother lay to the insulation and to bond the insulation more firmly to the wire core. Such tape, sometimes called a film strip, can be obtained commercially from Minnesota Mining and Manufacturing Company as "Scotch" "PTF" insulating film type "B" and is described in their sales bulletin No. E–PTF (33.5) LP.

The unfused polytetrafluorethylene tape is easily stretched, even at relatively low values of tension stress, and I have found that even a slight amount of stretching of the tape causes large numbers of minute voids to appear in the tape. Moreover, when unrestrained, this tape has a relatively high shrinkage upon fusion, particularly in the transverse direction. I have found that the presence of such minute voids has the effect of allowing the regions of the tape between the voids to shrink in unrestrained fashion upon fusion, thus enlarging the voids. In some instances where a number of such voids are initially closely adjacent, upon fusion the webs of material between the voids stretch apart and a much larger void is formed. Stretching of the tape and variations in the tension over the tape width cause shifting of the tapes relative to each other, varying the amount of overlap in the respective tapes along the length of the wire. Where a tracer-forming tape is involved, these variations cause undesirable changes in the appearance of the tracer along the length of the wire. Such changes have often caused the insulation base color and tracer color to reverse, i.e. a blue wire with a white tracer becomes a white wire with a blue tracer, or the tracer disappears altogether.

In order to prevent the formation of such voids, and to make the amount of overlap of the tapes remain constant along the length of the wire, the tension in the unfused tape or tapes as they are wound on the wire is maintained below 230 pounds per square inch of cross section of the tape and preferably below 200 pounds per square inch. For example in insulating a No. 20 wire, three tapes having a thickness of .004 inch and a width of 3/16 of an inch may be used with a tension of less than 2.75 ounces in each tape, corresponding to 230 pounds per square inch. Preferably the tension is less than 2.4 ounces (200 pounds per square inch), and customarily is held in the range from 1 to 1.75 ounces (85 to 150 pounds per square inch).

An advantage of the arrangement of the insulation with equal portions of the width of each of the tapes in the various underlying and overlapping positions is that the tensions in each of the tapes follow the same distribution patterns, each with slightly less tension in the inner portions of the width of each tape and with slightly more tension in the outer portions. Thus, the initial tension across the full width of each tape lies within the desired range from 1 to 1.75 ounces.

In some instances even less tension may be used. However, the unfused tape has the advantageous characteristic of adhering to itself and to the wire. A tension of at least 1 ounce in a tape of the size described above is usually used to obtain the proper adhesion of the tape prior to fusing.

After the tape is wound on the wire, it is fused by heating to a temperature of at least 650° F., forming the three tapes into an impervious homogeneous integral insulation layer. During the fusing operation the tape is restrained from shrinkage, longitudinally by the slight tension described above and transversely by its adhesion to the other tapes and to the conductor. Thus, the contraction occurs mainly in the thickness of the tape, the insulation layer shrinking from an initial thickness of 12 mils in its unfused state to about 9 mils. During this contraction the edges of the tape, for example see the edge 8 of the tape 7, taper into smooth relation with the abutting regions on the adjacent tapes where they make their transitions from the outer surface to the intermediate part of the insulation; for example see the smoothly curved transition region 9 of the tape 6 lying adjacent the tapered edge 8.

The contrasting tape 7 forms a tracer within the insulation layer for easy identification of the wire. As shown there is at every point along the wire a portion of this tracer adjacent the conductor, a portion intermediate the inner and outer surfaces of the insulation layer 4 and a portion at the outer surface of the insulation layer. This tracer forms an integral part of the insulation layer.

Insulated wire as described, in the present application, has no perforations. For example, I have taken several hundred feet of wire in accordance with the present invention and immersed it into salt water for a period of several weeks, with short lengths of both ends above the surface. I measured the electrical resistance between the conductor and the salt water throughout the period of immersion. Even at the end of this period the measurement continued to indicate an effectively infinite resistance, indicating the absence of perforations in the insulation and that there was no penetraton of the water into the conductor.

From the foregoing description it is seen that the present invention provides insulated wire well adapted to accomplish the ends and objects and to yield the advantages hereinbefore set forth.

As used herein "tape" is intended to include a length or a strip of material whether coated with other material, for example such as an adhesive agent, or not. "Wire" is intended to include electrical conductors whether solid or stranded and whether of circular or polygonal or of regular or irregular cross sections.

I claim:
1. The method of making an insulated electrical wire having a conductive core and an impervious insulation layer therearound of fused polytetrafluorethylene having an integral helical tracer therein of an appearance contrasting with the remainder of said insulation layer comprising the steps of helically winding a plurality of unfused tapes of polytetrafluorethylene around a conductor with one of said unfused tapes contrasting in color with respect to another of said unfused tapes, maintaining the tension in each of said unfused tapes at a value less than two hundred pounds per square inch of cross section, and thereafter fusing said tapes into a homogeneous insulation layer.

2. The method as claimed in claim 1 and wherein said tapes are applied in overlapping helical relationship with equal portions of the widths of the tape lying adjacent the conductor and lying adjacent the outside surface of the insulation layer.

3. The method of making an insulated electrical wire having a conductor and an impervious insulation layer therearound of fused polytetrafluorethylene comprising the steps of helically wrapping a plurality of unfused tapes of polytetrafluorethylene around a conductor while maintaining the tension across the full width of each tape in its unfused state at a value corresponding to an amount in the range from eighty-five to two hundred pounds per square inch of cross section of the tape, and then fusing said tapes into a homogeneous insulation layer.

4. The method of making an insulated electrical wire having a conductive core and an impervious insulation layer therearound comprising the steps of helically wrapping an unfused tape of polytetrafluorethylene around a conductive core while maintaining the tension in said unfused tape at a value less than that corresponding to 230 pounds per square inch of cross section of unfused tape, fusing said unfused tape at a temperature of at least 650° F.

5. The method of making an insulated electrical wire having a conductive core and an impervious insulation layer therearound comprising the steps of helically wrapping a plurality of unfused tapes of polytetrafluorethylene around a conductive core while maintaining the tension in each unfused tape less than a value corresponding to 230 pounds per square inch of cross section of unfused polytetrafluorethylene to form an insulation coating, then fusing said unfused tape in said coating at a temperature of at least 650° F. while shrinking the thickness of said coating to about three-fourths of its original thickness to form an impervious insulation.

6. The method as claimed in claim 5 and wherein during the fusing step the edges of each tape taper into smooth relationship with the abutting regions of adjacent tapes.

References Cited in the file of this patent

UNITED STATES PATENTS

| | | |
|---|---|---|
| 2,138,378 | Johnson | Nov. 29, 1938 |
| 2,248,840 | Wilkoff | July 8, 1941 |
| 2,312,058 | Youmans et al. | Feb. 23, 1943 |
| 2,366,944 | Veit | Jan. 9, 1945 |
| 2,389,725 | Gillis et al. | Nov. 27, 1945 |
| 2,454,625 | Bondon | Nov. 23, 1948 |
| 2,459,653 | Keyes | Jan. 18, 1949 |
| 2,516,751 | Brown | July 25, 1950 |
| 2,578,522 | Edgar | Dec. 11, 1951 |
| 2,631,186 | Bondon | Mar. 10, 1953 |
| 2,691,694 | Young | Oct. 12, 1954 |

FOREIGN PATENTS

| | | |
|---|---|---|
| 15,793 | Great Britain | July 1, 1910 |
| 235,661 | Great Britain | June 25, 1925 |